June 8, 1948.  A. O. SILER  2,442,907
AUTOMATIC WEIGHING MACHINE
Filed May 11, 1944  6 Sheets-Sheet 1

Inventor
Arvid O. Siler

June 8, 1948. A. O. SILER 2,442,907
AUTOMATIC WEIGHING MACHINE
Filed May 11, 1944 6 Sheets-Sheet 2

Inventor
Arvid O. Siler,
By
Attorney

June 8, 1948. A. O. SILER 2,442,907
AUTOMATIC WEIGHING MACHINE
Filed May 11, 1944 6 Sheets-Sheet 3

Inventor
Arvid O. Siler
By Pennie Davis Marvin Edmunds
Attorney

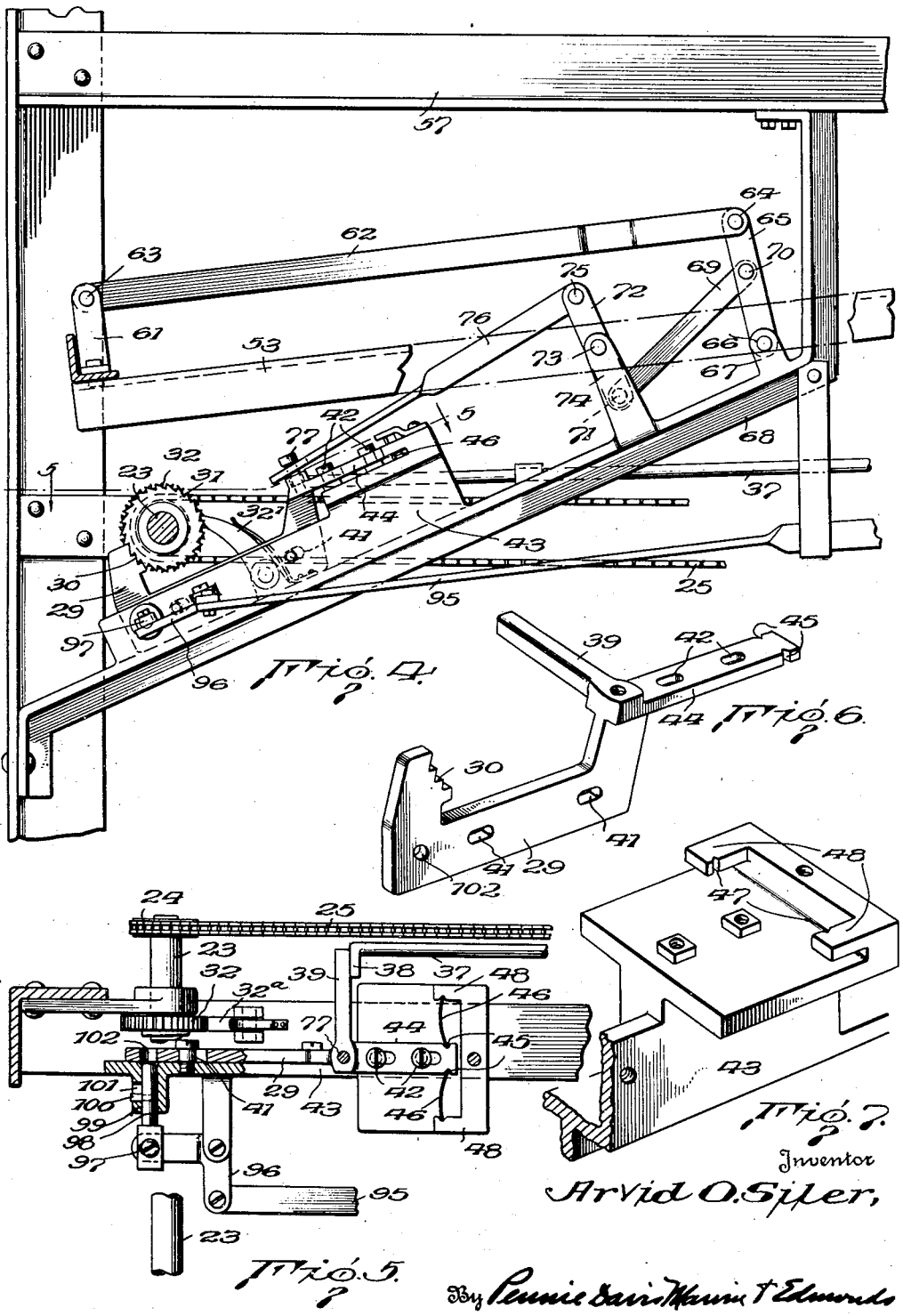

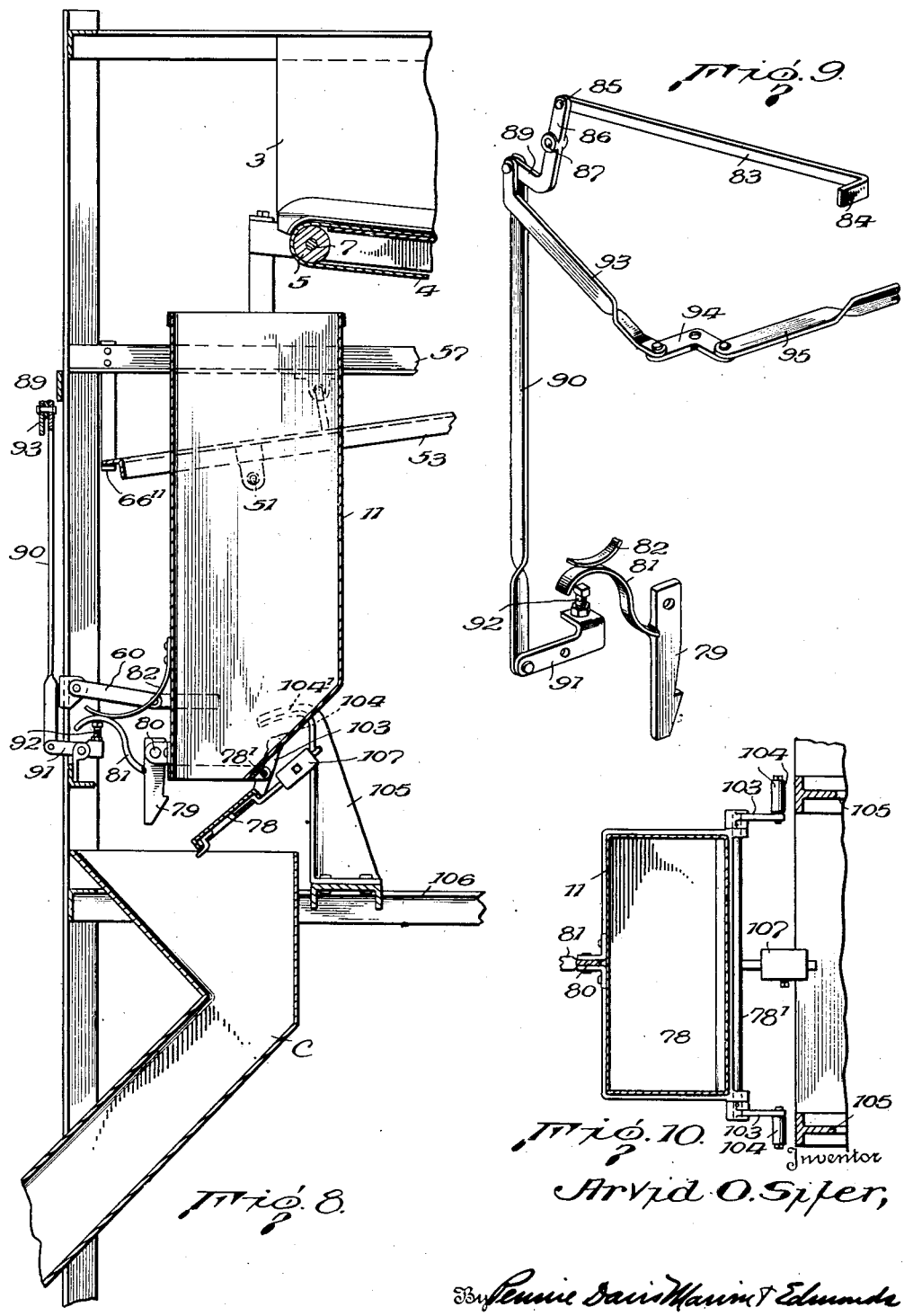

June 8, 1948. A. O. SILER 2,442,907
AUTOMATIC WEIGHING MACHINE

Filed May 11, 1944 6 Sheets-Sheet 6

Inventor
Arvid O. Siler,
By Pennie Davis Marvin Edmunds
Attorney

Patented June 8, 1948

2,442,907

UNITED STATES PATENT OFFICE 2,442,907

AUTOMATIC WEIGHING MACHINE

Arvid Ouchterlony Siler, Richmond, Va.

Application May 11, 1944, Serial No. 535,085

3 Claims. (Cl. 249—42)

This invention relates to a machine for automatically weighing and dispensing or vending bulk material. While it is adapted for the handling of any quantity of any type of solid bulk material, and with certain modifications for the handling of liquid material, it is particularly adapted for weighing and dispensing small quantities of material such as coal.

A large amount of coal is sold by retail dealers in very small amounts to persons who do not have sufficient means at any one time to purchase even as much as a quarter of a ton of coal. Much of this coal is sold in bags containing as little as ten or twenty pounds. The overhead in handling coal in small quantities is tremendous as the retailer not only has to take the necessary time to weigh out the coal but he is also frequently called upon to furnish strong bags in which the purchaser may carry the coal away. As in the end the overhead has to be borne by the purchaser, he pays a very high price, figured on a ton basis, for the coal. The interruptions caused the dealer by purchasers seeking such small amounts of coal is very bothersome. However, they have to be endured. The net result is that sales of coal in such quantities is satisfactory to none of the parties concerned.

The object of the present invention is to provide a practical machine which will automatically weigh out a predetermined amount of material such as coal and deliver it to the purchaser. In order that the machine shall not require the attention of an attendant it is coin or check controlled, and, after insertion of the proper coin or check is operable by the purchaser. With such a machine it is only necessary that the dealer maintain a supply of coal in the hopper which supplies the machine. The overhead heretofore attendant upon the sale of small quantities of coal is eliminated and the dealer can afford to give the purchaser as much as 33⅓% more coal for the same amount of money and still make a reasonable profit on the sale.

Such a machine, to be commercially practical, must be simple so that it can be sold to the retailer at a relatively low price, accurate so that the purchaser will get full weight, but no more, simple to operate, and so constructed that unscrupulous persons cannot interfere with its normal operation.

In order that the machine of the present invention shall have embodied therein the above features, it is so arranged that when a proper coin has been inserted a power shaft may be operated to cause coal to be gradually fed into a weighing hopper. When the predetermined amount of coal has been fed into the weighing hopper it overcomes the weight of a counterpoise and causes the operation of mechanism which locks the power shaft against further rotation to prevent an overweight of coal being furnished. After the power shaft has been locked against further rotation, but not before, the purchaser may cause the opening of a door in the lower side of the weighing hopper and permit the coal to flow therefrom into a discharge chute from which it may run into a bucket or bag furnished by the purchaser. If desired there may be associated with the automatic weighing and dispensing machine a bag vending machine adapted to furnish the purchaser, either gratis, or for a nominal amount, a bag into which he may cause the coal to be dumped.

After the coal has flowed from the weighing hopper the weight of the counterpoise causes the hopper to be lifted again to its original, coal-receiving position, but the power shaft remains locked against rotation until the insertion of another coin, when the machine may again be operated as before.

The invention also includes means whereby a machine as above described may be associated with a silo or other large coal storage place and equipped with means remotely controlled, as from the office of the coal dealer, whereby coal in large amounts may be dispensed to trucks or the like.

Heretofore, the practice generally followed in connection with the delivery of coal has been for the driver to get his order at the office of the coal dealer, proceed to the silo or other place of storage where an amount of coal approximating the desired weight is loaded into the truck and return to the yard of the dealer where the load is weighed. If the load contains more than the amount desired the excess is shoveled off into bins adjacent the scales. If the load is underweight the deficiency is supplied from coal in the bins. With the present invention this primitive method is abolished.

The invention will be described in connection with the accompanying drawing, but it is to be understood that this further illustration and description is by way of exemplification and that the invention is not limited thereto, except as is specifically set forth in the subjoined claims.

In the drawings:

Fig. 4 is an enlarged view of the locking mechanism, the same being viewed from the side opposite that shown in Fig. 1, and the parts being shown in locked position;

Fig. 5 is a sectional view taken substantially on line 5—5 of Fig. 4 with the locking ratchet and pawl being broken away;

Figs. 6 and 7 are perspective views respectively of the locking pawl and the mounting means therefor;

Fig. 8 is a vertical sectional view through the weighing hopper and associated mechanism, the same being taken on line 8—8 of Fig. 3;

Fig. 9 is a perspective view of the means for effecting the release of the discharge door of the weighing hopper;

Fig. 10 is a horizontal sectional view taken on line 10—10 of Fig. 1;

Fig. 11 is a detail sectional view of the mounting for the weighing hopper;

Fig. 12 is a detail view showing an over-running clutch for the power shaft operating mechanism.

Figure 1:
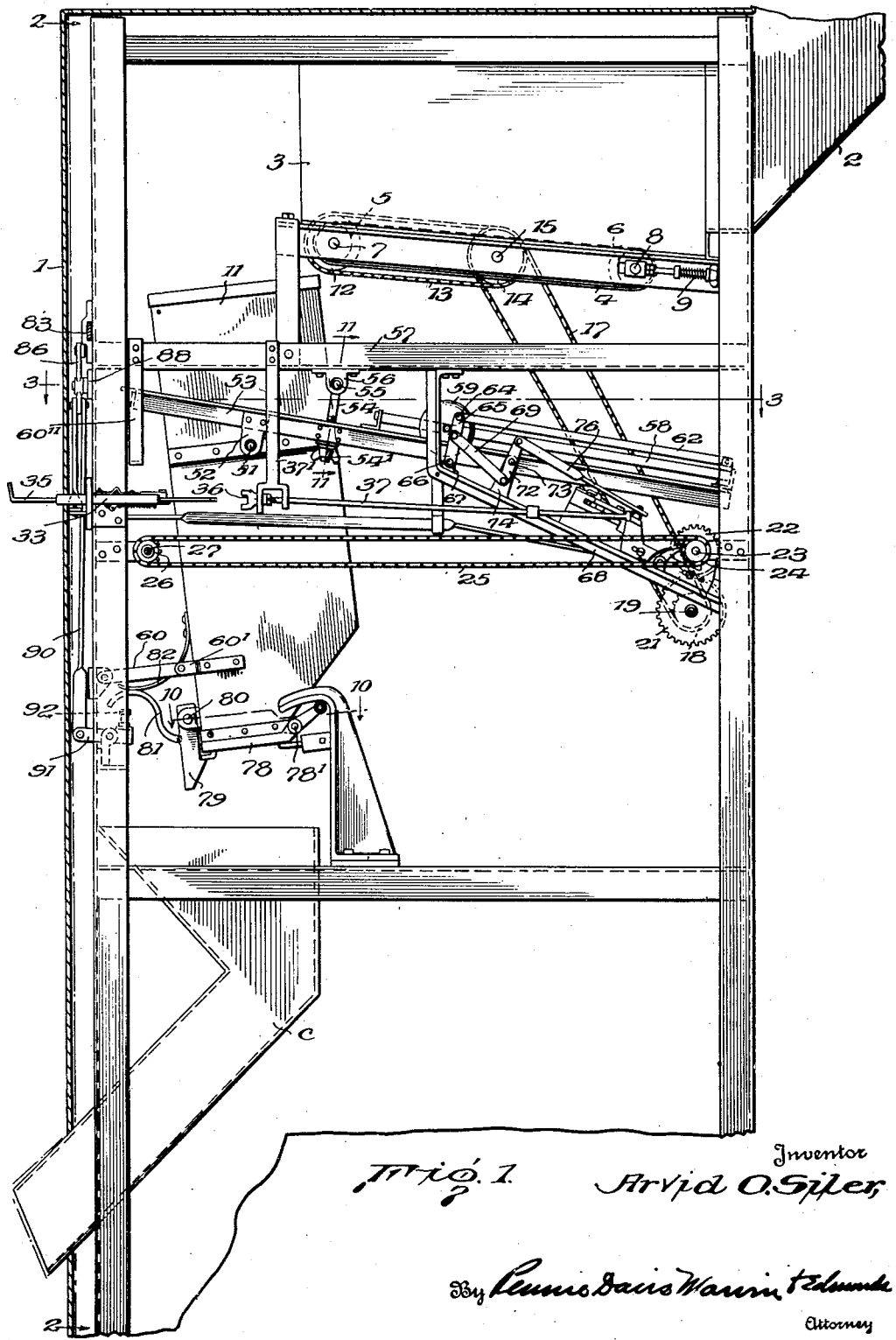
Fig. 1 is a side elevation of the operating mechanism of a machine embodying the invention, the outer casing of the machine being shown in section.

In the drawings, the numeral 1 designates a casing enclosing the operating mechanism of an automatic weighing and vending machine whereby the same may not be tampered with, or operated, except in the manner contemplated. In use the machine will be located adjacent a discharge opening of a silo or other bin 2, which will hold a relatively large amount of the coal or other material to be dispensed.

Coal flows from the bin 2 into a receiving hopper 3 located at the upper portion of the machine. The bottom of the hopper 3 is formed by the upper flight of an endless conveyor 4, which passes around pulleys 5 and 6 secured to shafts 7 and 8 respectively. The shaft 7 is fixed to the frame of the machine, but the shaft 8 is movable longitudinally of the conveyor under the influence of a tightening spring 9, whereby the conveyor is at all times maintained under the desired tension. The conveyor 4 inclines upwardly toward the discharge end to prevent flow of the coal from the receiving hopper 3 to the weighing hopper 11, except when the conveyor is being operated to pull the coal along to the discharge end thereof.

Figure 2:
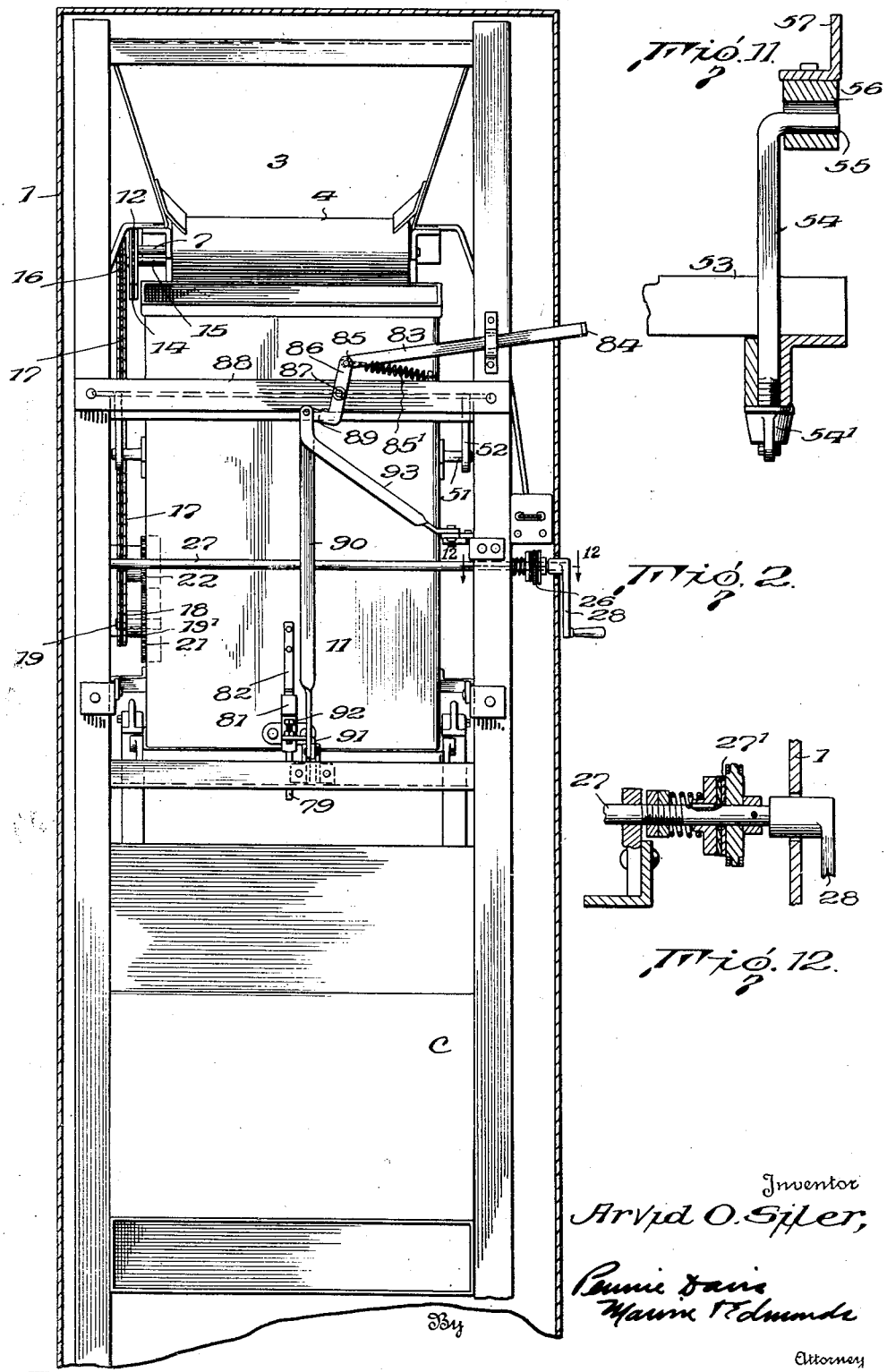
Fig. 2 is a vertical sectional view taken on line 2—2 of Fig. 1.

As shown in Figs. 1 and 2, a sprocket 12 is secured to one end of the shaft 7 and turns therewith. A chain 13 passes around the sprocket 12 and around a similar sprocket 14 secured to a shaft 15 mounted in the frame of the machine. The shaft 15 also carries a second sprocket 16, around which the upper portion of an endless chain 17 passes. The lower end of the chain 17 passes around sprocket 18 secured on a shaft 19 mounted in bearing 19'. The shaft 19 carries a gear 21 which meshes with a gear 22 on a main power shaft 23. As the power shaft 23 is located at the rear of the machine and as it is desired to have it operable from the front of the machine it carries a sprocket 24 around which one end of an endless chain 25 passes. The other end of the chain 25 passes around a sprocket 26 on a shaft 27 located at the front of the machine. The shaft 27 protrudes through one side of the casing 1 and has an operating handle 28 secured thereto. The shaft 27 is preferably provided with an over-running clutch 27' of any desired form, whereby any undue strain placed upon the handle 28 will not affect the operating mechanism.

By turning the handle 28 movement may be imparted to the power shaft 23 and through the several sprockets and chains just described to the conveyor 4. However, such movement is normally prevented by a locking pawl 29 having teeth 30 engaging the teeth of a ratchet wheel 31 rigidly secured to and rotatable with shaft 23, as will more fully appear from the following description. Movement of shaft 23 in the reverse direction is prevented by a ratchet wheel 32 and a spring-pressed pawl 32'.

Figure 3:
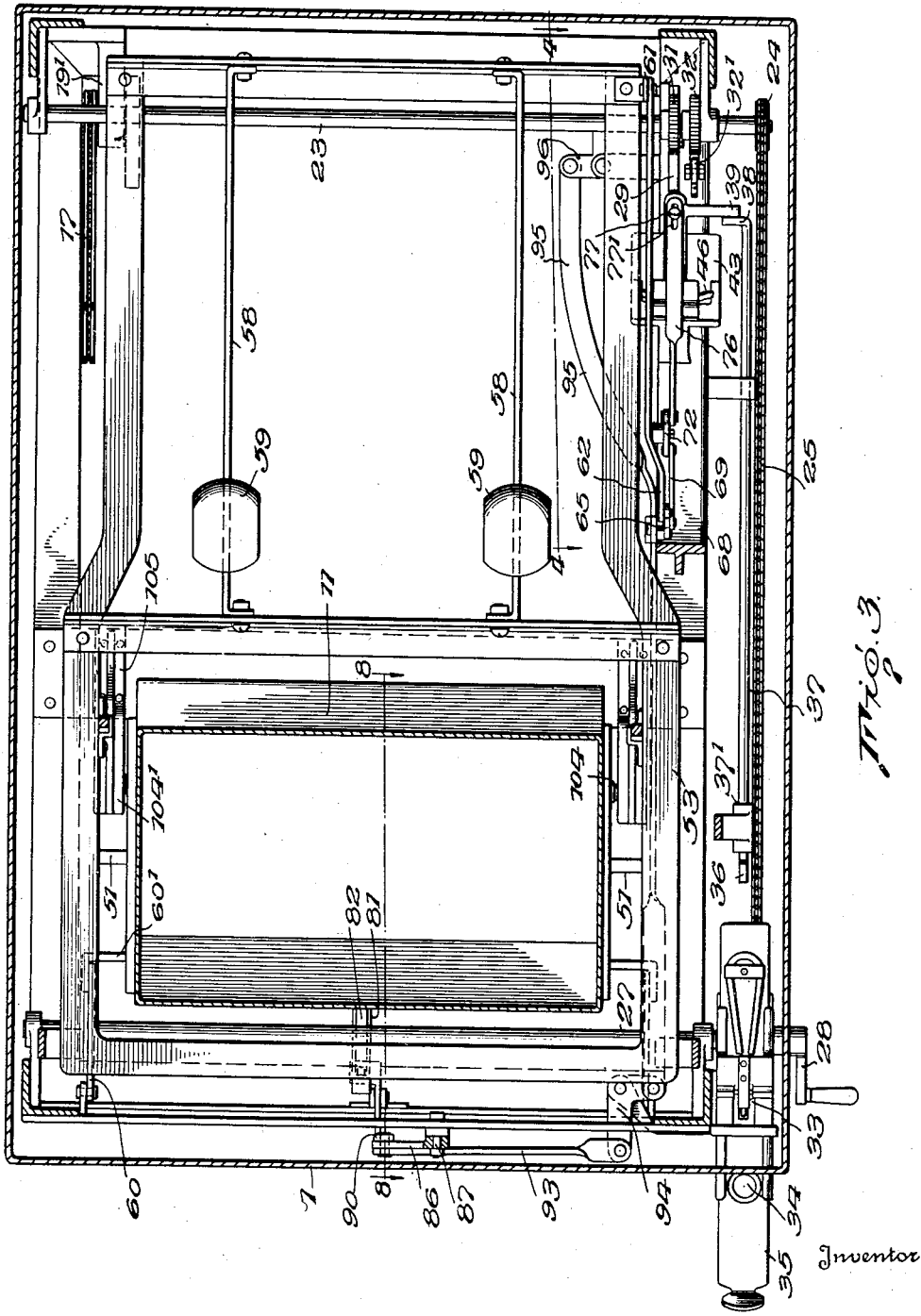
Fig. 3 is a horizontal sectional view taken on line 3—3 of Fig. 1.

As has just been stated, the pawl 29 normally locks the shaft 23 against rotation to prevent movement being imparted to the conveyor 4 to discharge coal into hopper 11. The unlocking of the pawl is controlled by a coin or check-controlled mechanism 33 of standard construction. The coin-control mechanism per se forms no part of the present invention and will not be described in detail. It is sufficient to point out that when a proper coin is inserted in an opening 34 (Fig. 3), a bar 35 may be pushed inwardly a distance sufficient to cause its inner end to engage the end 36 of a rod 37 slidable in a guide 37' and move it to the right in Fig. 1 (to the left in Fig. 4). When the rod 37 is thus moved its other bent end portion 38 engages a lateral extension 39 of the locking pawl 29 and moves it longitudinally a distance sufficient to cause the teeth 30 to become disengaged from the teeth of the ratchet wheel 31. Such longitudinal movement of the pawl 29 is made possible by pin-and-slot connections 41 and 42, which the pawl has with a casting 43 on which it is mounted.

To assist in maintaining the pawl 29 in locked position except when coal is actually being discharged and to impart a quick and positive movement thereto, the pawl carries at the end remote from the teeth 30, an extension 44 which has notches 45 on each side near its outer end. Flat leaf springs 46 are sprung into the notches 45 and corresponding notches 47 in extensions 48 on the upper side of the casting 43 (Fig. 7). The springs 46 hold the pawl in either locked or unlocked position until the proper mechanism is operated to shift it from its position, and provide means for imparting a snap action to the pawl the instant the notches 45 pass in either direction beyond a line drawn through the notches 47.

The weighing hopper 11 has knife-edged trunnions 51 extending from each side which are received in bearings 52 depending from a rectangular frame 53. The frame 53 is supported by hangers 54 which have angular knife-edged extensions 55 received in bearings 56 depending from the stationary member 57 forming a part of the framework of the machine. The lower ends of the hangers are threaded to receive the wing nuts 54', whereby the position of the frame may be accurately adjusted to cause operation of the parts at exactly the proper instant. The frame 53 carries a pair of bars 58 along which counterpoises 59 may be adjusted to predetermine the amount of coal which will be dispensed by the machine at each operation.

The bearings 52, frame 53, and bearings 56 form a mounting for the weighing hopper which permits it to move downwardly when the weight of the coal therein overcomes the weight of the counterpoises 59. A link 60 pivoted at one end to the framework and at its other end to a projection 60' extending from the hopper, acts as a guide for the hopper during its downward movement and prevents free swinging of the hopper in the bearings 56. The extent of the downward movement of the hopper is limited by a strap 60'' which the front end of the frame engages when the hopper has moved downwardly a sufficient distance.

As the bearings 56 are immovable, a downward movement of the hopper 11 will cause the frame 53 to swing slightly to the right in Fig. 1 (to the left in Fig. 4) about the trunnions 55 as a center with the result that the end of the frame remote from the hopper will be raised slightly. That end of the frame carries an upstanding lug 61 to which one end of a link 62 is pivotally mounted at 63. The other end of the link 62 is pivotally connected at 64 to a lever 65, which, in turn, is pivoted at 66 to a lug 67 extending upwardly from a rigid frame member 68. Link 69 has a pivotal connection 70 at one end with the lever 65, and a pivotal connection 71 at its other end with one end of a lever 72. The lever 72 is pivotally connected at an intermediate point 73 to a stationary lug 74 forming a part of the rigid frame member 68. The other end of the lever 72 is pivotally connected at 75 to one end of a link 76. The other end of the link 76 is connected to the pawl 29 by a screw 77 passing through a slot 77' in the end thereof. The slot 77' permits the link 76 to move in the reverse direction when the hopper rises without disengaging the pawl 29 from the teeth of the ratchet 31, and provides for a certain delay in moving the pawl into locking engagement with the ratchet during the descent of the weighing hopper.

With the arrangement of links and levers just described, it will be noted that as the hopper descends under the weight of the coal therein, the frame 53 will swing counterclockwise in Fig. 1 about the trunnions 55 as a center, thereby causing the end to which the link 62 is pivoted to be raised. Upward movement of that end of the frame 53 causes link 62 and lever 65 to assume a position more in alignment, with the result that the lever 65 and link 69 are moved to the right in Fig. 1 (to the left in Fig. 4). Such movement of link 69 will swing lever 72 about its pivot 73 in a counterclockwise direction in Fig. 1 or clockwise in Fig. 4, and move link 76 so that it will slide the pawl 29 to a position in which the teeth 30 thereof engage the teeth of the ratchet 31 and lock the shaft 23 against further rotation. The parts are shown in that position in Fig. 4. However, as the pin 77 lies in the end of the slot remote from the end of the link 76 when the pawl is disengaged from the ratchet 31, the movement of the pawl into engagement with the ratchet does not take place immediately upon the hopper beginning its downward movement. But when the lost motion provided by the slot 77' is taken up and the pawl begins to move to engage the ratchet that movement will be accelerated by the springs 46 as soon as they pass dead center, with the result that the pawl is given a snap action to bring it into locking engagement with the ratchet. Such delayed action prevents the pawl from locking the power shaft 23 against rotation due to any slight downward movement being imparted to the hopper, as for instance by the impact caused by the initial flow of the coal into the hopper, and insures that the shaft 23 is not locked against rotation until a sufficient amount of coal has been delivered to the weighing hopper 11 to cause it to overcome the weight of the counterpoises 59.

The proper amount of coal having been discharged into the weighing hopper, it having descended, and the pawl 29 having engaged the ratchet 31 to prevent further movement being imparted to the power shaft 23 and consequently the conveyor 4, the coal is now ready to be discharged into a chute C for delivery to the purchaser. The chute C has a bend therein so that it is impossible for an unscrupulous person to insert his arm or a tool up the chute to interfere with the normal operation of the machine. The lower end of the chute protrudes through the front of the casing so that the coal may flow into a sack or other container for the same.

The lower end of the weighing hopper is normally closed by a door 78 swingable about the shaft 78' as a center. The door 78 is held in closed position by a latch 79 pivoted at 80 to the side of the hopper. The latch has a curved arm 81 extending from one side against which bears a flat leaf spring 82 having one end attached to the hopper. The spring tends to move the latch about the pivot 80 to maintain the latch in position to hold the door closed.

For discharging the coal in the weighing hopper 11 a series of links and levers for releasing the latch 79 are provided. These include a link 83 having one end 84 extending through the front of the casing where it is readily accessible and its other end pivotally connected at 85 to one end of a bell crank lever 86, pivoted at 87 to a member 88 forming a part of the framework of the machine. The other end 89 of the bell crank has pivotally connected to one side thereof a depending link 90 which is pivotally connected at its lower end to one end of a lever 91 pivoted to a fixed part of the framework. The other end of the lever 91 carries an adjustable set screw 92 which bears against the lower side of the latch arm 81 when the hopper 11 has descended. Thus, when the end 84 of the link 83 is pushed inward, the bell crank 86 is rotated about the pivot 87 and causes the vertical link 90 to be depressed. Such movement of the link 90 causes lever 91 to be swung about its pivot and the end carrying the set screw 92 to be raised. As the set screw 92 bears against the lower side of the latch arm 81, that arm will also be raised, and the latch 79 swung about the pivot 80 to release the door 78 to permit the coal to flow into the chute C. A spring 85' having one end secured to the pivot 85 and its other end to a part of the framework tends to maintain the lever 83 in its outer position.

In order that the discharge door 78 may not be released while the hopper 11 is being filled and until the full amount of coal to be dispensed has been supplied to the hopper and the hopper has descended to its lowermost position under the weight of the coal, and the pawl 29 has been moved into position to lock the shaft 23 against rotation, the end 89 of the bell crank 86 is also connected to one end of a link 93. As best shown in Figs. 2, 5 and 9, the other end of link 93 is pivotally connected to one end of a bell crank lever 94 mounted on a part of the framework at the front of the machine. The other end of the bell crank 94 is pivotally connected to a rearwardly extending link 95. The link 95, see Fig. 5, is pivotally connected to one end of another bell crank lever 96, which at its other end has a pin and slot connection 97 with a pin 98 slidable in a bore 99 formed in the casting 43, on which the locking pawl is slidably mounted. The pin 98 has a projection 100 extending from one side thereof into a slot 101 whereby the movement of the pin within the bore 99 is limited. The locking pawl 29 has formed therein an aperture 102 of approximately the same diameter as the diameter of the bore 99. When the weighing hopper has descended and caused pawl 29 to be moved into locking engagement with the ratchet 31, that is, when it is in the position shown in Figs. 4 and 5, the aperture 102 will register with the bore 99 so that the pin is free to move into the aperture. At all other times the aperture 102 is out of alignment and the pin 98 is not free to slide in the bore 99. As the link 93 is connected to the end 89 of the bell crank lever 86, a swinging of that lever about its pivot imparts movement to the link 93 as well as the link 90. The movement of link 93 rotates bell crank lever 94 about its pivot and causes link 95 to turn bell crank lever 96 about its pivot in a clockwise direction. Such movement of the bell crank lever 96 will cause the pin 98 to move into the aperture 102 of the pawl 29. However, if the aperture 102 is not in alignment with the pin 98, the pin and associated links and levers, including the discharge lever 83, cannot move. Therefore, the pin 98 forms an effective means of preventing any discharge of coal from the weighing hopper until after the hopper has descended under the weight of the coal to be delivered. If it were not for the pin 98, it would be possible for the latch 79 which holds the door 78 closed to be released before the weighing hopper 11 descends and locks the shaft 23 against further rotation.

After the weighing hopper has descended and the coal contained therein has been released in the manner just described the counterpoises 59 will cause the hopper to be raised again to its coal receiving position.

The discharge door 78 has extensions 103 carried at each side thereof. The ends of these extensions are provided with rollers 104 which, as the door rises, engage the overhanging portion 104' of brackets 105 secured to the member 106 constituting a part of the framework of the machine. As the hopper rises the rollers 104 engage the overhanging portions of the brackets 105 and cause the door to be brought into closed position, in which position it is held by the latch 79. A counter weight 107 carried by the door also assists in rotating the door about the shaft 78' to bring the door into closed position.

The operation of the machine is as follows:

Assuming that the weighing hopper is in its normal elevated position ready to receive coal from the receiving hopper 3, a proper coin will be inserted in the slot 34 of the coin controlled mechanism 33 and the slide 35 thereof pushed inwardly to cause its inner end to engage the end 36 of the sliding rod 37 and move it to the right in Figure 1. As the rod 37 is moved to the right in Figure 1 (to the left in Figure 4) the end 38 thereof will engage the lateral extension 39 to slide the locking pawl 29 to the left in Figure 4 and cause the teeth thereof to become disengaged from the teeth of ratchet 31 on the power shaft 23 thereby permitting movement to be imparted to said shaft. The purchaser will then rotate the handle 28 which will impart movement to the power shaft 23 which in turn causes the conveyor 4 to be operated to discharge coal from the receiving hopper 3 into the weighing hopper 11. When the predetermined amount of coal has been discharged into the weighing hopper 11 it will descend under the weight thereof and cause the frame 53 to be swung in a counterclockwise direction in Figure 1 about the trunnions 55. Such movement of the frame 53 will cause the end carrying the lug 61 to be raised. As the end of the frame 53 rises the link 62 and the lever 65 tend to move more into alignment with the result that the lever 65 swings to the left in Figure 4 (to the right in Figure 1). Simultaneously therewith the link 69 rotates the lever 72 in a clockwise direction (Fig. 4) about its pivot 73 with the result that the link 76 slides the locking pawl 29 to the right in Figure 4 a sufficient distance to cause the teeth 30 thereof to engage the teeth of the ratchet 31 on the power shaft 23 and lock the same against rotation. This movement also brings the aperture 102 in the pawl 29 into alignment with the bore 99 so that the pin 98 is free to slide within said bore.

The parts having been brought into the position just described the coal may now be dumped from the weighing hopper. Such discharge of the coal is effected by the purchaser pushing inwardly on the lever 83 which causes the vertical link 90 to be depressed and the end of the link 91 carrying the set screw 92 to be raised sufficiently to cause the latch 79 holding the discharge door 78 to be released, whereupon the coal flows out of the weighing hopper 11 into the chute C which delivers it to the purchaser. The coal having been discharged the hopper rises and the discharge door is closed so that the machine is again ready for another operation.

Figure 13:
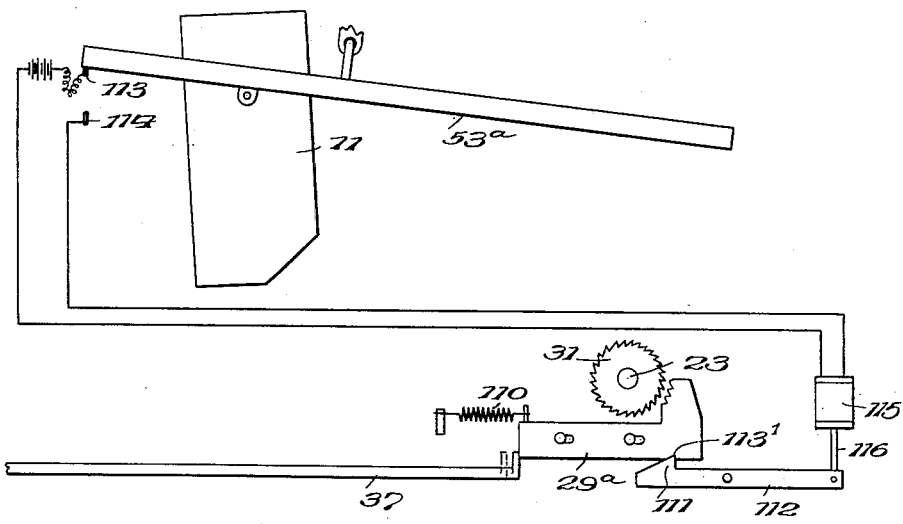
Fig. 13 is a diagrammatic view of a modified arrangement wherein electrical means are employed for locking the power shaft against rotation when a predetermined amount of coal has been supplied to the weighing hopper.

In Fig. 13 there is diagrammatically shown electrical means for locking the shaft 23 against rotation when the hopper 11 descends under the weight of the coal contained therein. In this modification the pawl 29a is constantly urged by a spring 110 into position to engage the teeth of rachet wheel 31 on shaft 23 to lock the same against rotation, but may be moved into its disengaged position by the insertion of a proper coin and pushing in rod 37 as described in connection with the form of the invention disclosed in connection with Figs. 1 to 12. When the pawl is moved to its disengaged position, a tooth 111 on a pivoted lever 112 engages a notch 113' in the lower side of the pawl and holds it in that position to permit the shaft 23 to be rotated to impart movement to the conveyor to supply coal to the hopper 11.

The frame 53a on which the hopper 11 is mounted carries a contact 113 adapted to cooperate with a stationary contact 114 to complete an electrical circuit through the solenoid 115. The solenoid is operatively connected through the link 116 to the lever 112, so that when the hopper 11 descends and completes the electrical circuit through the solenoid 115, the latter will pull up on link 116 and cause the lever 112 to be swung about its pivot sufficiently to withdraw the tooth 111 from the notch 113' in the pawl, whereupon the spring 110 immediately moves the pawl to the left to cause it to engage the teeth of the ratchet wheel 31 and lock the shaft 23 against rotation until the hopper again rises and another coin is inserted.

While the receptacle 11 has been referred to as a weighing hopper, the word "hopper" is not used in a limited sense and where it is referred to in the subjoined claims it is, unless otherwise qualified, intended to include any type of receptacle.

I claim:

1. In an automatic weighing machine, a supply hopper for material to be weighed, a weighing hopper positioned to receive material from the supply hopper, said weighing hopper being so mounted as to descend when a predetermined weight of material has been delivered thereto, means for causing the delivery of material from the supply hopper to the weighing hopper, a power shaft from which said delivery means is driven, means for normally locking said power shaft against rotation, said means including a ratchet wheel carried by said power shaft and a pawl normally engaging the teeth of said ratchet wheel, check controlled means for disengaging the pawl from the teeth of the ratchet wheel to permit said power shaft to be rotated to cause delivery of material from the supply hopper to the weighing hopper, means operable upon descent of the weighing hopper to move said pawl into engagement with the ratchet teeth and thereby lock said power shaft against rotation, means to restore said weighing hopper to its upper position, and means for maintaining said pawl in engagement with the teeth of said ratchet wheel after the weighing hopper is restored to its upper position and until again released by the check controlled means.

2. In an automatic weighing machine, a supply hopper for material to be weighed, a weighing hopper positioned to receive material from the supply hopper, said weighing hopper being so mounted as to descend when a predetermined weight of material has been delivered thereto, means for causing the delivery of material from the supply hopper to the weighing hopper, a power shaft from which said delivery means is driven, means for normally locking said power shaft against rotation, said means including a ratchet wheel carried by said power shaft and a pawl normally engaging the teeth of said ratchet wheel, means for disengaging the pawl from the teeth of the ratchet wheel to permit said power shaft to be rotated to cause delivery of material from the supply hopper to the weighing hopper, means operable upon descent of the weighing hopper to move said pawl into engagement with the ratchet teeth and thereby lock said power shaft against rotation, means for causing the discharge of material from the weighing hopper, and means preventing the operation of said last mentioned means until the weighing hopper has descended and the pawl has been moved into engagement with the ratchet wheel.

3. In an automatic weighing machine, a supply hopper for material to be weighed, a weighing hopper positioned to receive material from the supply hopper, said weighing hopper being so mounted as to descend when a predetermined weight of material has been delivered thereto, means for causing the delivery of material from the supply hopper to the weighing hopper, a power shaft from which said delivery means is driven, means for normally locking said power shaft against rotation, said means including a ratchet wheel carried by said power shaft and a pawl normally engaging the teeth of said ratchet wheel and having an aperture therein, means for disengaging the pawl from the teeth of the ratchet wheel to permit said power shaft to be rotated to cause delivery of material from the supply hopper to the weighing hopper, means for causing the discharge of material from the weighing hopper, a pin smaller than the aperture in the pawl normally abutting the pawl and preventing operation of the means for discharging the weighing hopper, and means operable upon descent of the weighing hopper to move the pawl into engagement with the teeth of the ratchet wheel and to bring the aperture therein into alignment with said pin whereby said pin may enter said aperture and permit operation of the weighing hopper discharge means.

ARVID OUCHTERLONY SILER.

REFERENCES CITED

The following references are of record in the file of this patent:

UNITED STATES PATENTS

| Number | Name | Date |
|---|---|---|
| 731,845 | Blaisdell | June 23, 1903 |
| 1,066,656 | Richardson | July 8, 1913 |
| 1,126,164 | Williams | Jan. 26, 1915 |
| 1,859,444 | Howe | May 24, 1932 |
| 1,895,297 | Steere | Jan. 24, 1933 |
| 1,911,235 | Morrow | May 30, 1933 |
| 2,028,544 | Howe | Jan. 21, 1936 |
| 2,139,903 | Mason et al. | Dec. 13, 1938 |
| 2,212,419 | Harmon | Aug. 20, 1940 |
| 2,232,404 | Pratt | Feb. 18, 1941 |
| 2,258,081 | Weckerly | Oct. 7, 1941 |
| 2,260,718 | Merrifield | Oct. 28, 1941 |

FOREIGN PATENTS

| Number | Country | Date |
|---|---|---|
| 15,517 | Great Britain | 1890 |
| 253,029 | Great Britain | June 10, 1926 |